United States Patent Office 3,746,759
Patented July 17, 1973

3,746,759
SEPARATION OF ORGANIC SULFONYL CHLORIDES
Carl D. Kennedy and Wallace R. Weaver, Ponca City, Okla., assignors to Continental Oil Company, Ponca City, Okla.
No Drawing. Filed Feb. 22, 1971, Ser. No. 117,795
Int. Cl. C07c 143/20
U.S. Cl. 260—543 R                                  11 Claims

ABSTRACT OF THE DISCLOSURE

The present invention relates to the preparation and purification of organic sulfonyl chlorides, and more particularly, to the separation of alkane sulfonyl chlorides produced in the combined reaction of sulfur dioxide and chlorine with a paraffin hydrocarbon compound into fractions of different polarity. By the present invention, the alkane sulfonyl chloride mixture, the mixture remaining after the extraction with a selective solvent or the extract mixture obtained is cooled to a temperature effective to cause the crystallization of more polar alkane sulfonyl chlorides contained therein. The crystalline material is separated from the remaining liquid fraction containing less polar alkane sulfonyl chlorides, and melted to obtain fractions containing more polar alkane sulfonyl chlorides.

BACKGROUND OF THE INVENTION

(1) Field of the invention

The present invention relates generally to the preparation and purification of organic sulfonyl chlorides, and more particularly, but not by way of limitation, to the separation of alkane sulfonyl chlorides produced in the combined reaction of sulfur dioxide and chlorine with a paraffin hydrocarbon compound into fractions of different polarity.

(2) Description of the prior art

Alkane sulfonyl chlorides can be converted simply and smoothly into sulfonic acids or their salts. Because alkane sulfonyl chlorides are highly reactive and readily undergo numerous reactions, they have found a great variety of industrial uses. For example, the sulfonate products prepared from alkane sulfonyl chlorides have good wetting properties and are used as surface active agents. The esters of the sulfonic acids produced from alkane sulfonyl chlorides have applications as plasticizers, emulsifiers, and soap substituents. The sulfonyl chlorides have direct applications in leather treating and in water proofing various materials. Other compounds useful for the treatment of textiles, paper, leather, and plastics, as well as for oxidizing, bleaching, and disinfectant agents may be formed utilizing alkane sulfonyl chlorides as starting materials.

Alkane sulfonyl chlorides are most commonly produced by the chlorosulfonation of paraffin hydrocarbons having at least 5 carbon atoms. That is, sulfur dioxide and chlorine are reacted with a saturated aliphatic hydrocarbon having at least 5 carbon atoms under the action of ultraviolet light to produce a liquid reaction mixture comprised of monosulfonyl chlorides, disulfonyl chlorides and various polysulfonyl chlorides, as well as unreacted hydrocarbons, halogenated hydrocarbons and other by-product impurities. The presence of unreacted hydrocarbons, halogenated hydrocarbons and the like, often has a detrimental effect on the efficiency of the salts and other compounds prepared from the sulfonyl chlorides. Because of the solvent action of the sulfonyl chlorides, appreciable quantities of the impurity materials are held in solution and cannot be readily separated. However, the sulfonyl chloride products can be purified by extraction from the reaction mixture with solvents for polar compounds. Such solvents as nitromethane, methyl formate, and liquid sulfur dioxide have heretofore been used to advantage as selective solvent media for separating the sulfonyl chloride products from unreacted hydrocarbons, halogenated hydrocarbons, and the like.

While the extracted alkane sulfonyl chloride mixture is relatively free of impurity compounds, it includes a variety of sulfonyl chloride compounds and isomers. Specifically, as mentioned above, alkane monosulfonyl chloride, disulfonyl chloride, and various polysulfonyl chloride compounds, and the isomers thereof, are present in the mixture. Due to the similarity in physical properties of all of these compounds, they cannot be readily separated by conventional methods. Thus, heretofore, the entire extracted and purified alkane sulfonyl chloride mixture has been employed in industrial applications and for the preparation of desired derivatives even though more effective use could be made of individual compounds or selected mixtures thereof. By the present invention, a process is provided whereby the distribution of sulfonyl chloride compounds and isomers in a mixture may be altered by separating the sulfonyl chloride compounds into more and less polar fractions.

SUMMARY OF THE INVENTION

The present invention relates to a process of separating a mixture comprised of alkane monosulfonyl chlorides, disulfonyl chlorides and polysulfonyl chlorides into more polar and less polar fractions which comprises the steps of cooling the mixture to a temperature effective to cause the crystallization of more polar compounds contained therein, separating the crystalline material from the remaining fraction containing less polar compounds, and melting the crystalline material to obtain a fraction containing more polar compounds.

It is, therefore, a general object of the present invention to provide a process for the separating of organic sulfonyl chlorides.

A further object of the present invention is the provision of a process for separating a mixture of alkane monosulfonyl chlorides, disulfonyl chlorides, polysulfonyl chlorides, and other alkane compounds into more polar and less polar fractions.

Yet a further object of the present invention is the provision of a process for separating alkane sulfonyl chlorides contained in the alkane sulfonyl chloride reaction mixture formed by the combined reaction of sulfur dioxide and chlorine with an alkane hydrocarbon compound into more polar and less polar fractions.

Other objects of the invention will be apparent from the more detailed description given hereafter.

DESCRIPTION OF THE PREFERRED EMBODIMENTS

It is known that the liquid reaction product mixture obtained by the combined reaction of sulfur dioxide and chlorine with an alkane hydrocarbon compound having at least 5 carbon atoms contains a variety of sulfonyl chloride compounds. Specifically, the sulfonyl chloride substituent may attach to the alkane molecule at any point along the chain. Further, one or more sulfonyl chloride substituents may attach to the same alkane molecule. Thus, various isomers of alkane monosulfonyl chlorides, disulfonyl chlorides, trisulfonyl chlorides, etc. are formed. Also, as is understood by those skilled in the art, the polarity of such alkane monosulfonyl chloride compounds decreases as the sulfonyl chloride substituent is moved from an end of the alkane molecule towards the center thereof. That is, for a particular alkane molecule, the most polar mono-substituted sulfonyl chloride compound is the 1-monosulfonyl chloride. The 2-monosulfonyl chloride is less polar than the 1-monosulfonyl chloride, the 3-monosulfonyl chloride is less polar than the 2-monosulfonyl chloride, and so on. Further, it is known that the mono-substituted sulfonyl chloride compounds are less polar than the di-substituted and poly-substituted compounds.

The present invention is based on the discovery that highly polar alkane sulfonyl chloride compounds contained in a mixture are crystallized at reduced temperatures. Further, the quantity and particular alkane sulfonyl chloride compounds which crystallize vary with the temperature to which the mixture is cooled. Specifically, the temperature of a mixture of alkane sulfonyl chloride compounds, the extracted mixture remaining after extraction with a selective solvent for highly polar alkane sulfonyl chlorides or the extract mixture obtained may be lowered to a point effective to cause the crystallization of the more polar sulfonyl chloride compounds contained therein, and the crystalline materials separated from the remaining mixtures.

The process of the present invention may be employed to obtain more or less polar fractions of an alkane sulfonyl chloride mixture. This is advantageous since by varying the polarity of the alkane sulfonyl chloride mixture the properties of derivatives prepared therefrom are also varied. For example, highly polar alkane sulfonyl chloride mixtures are advantageously used to form sulfonates useful in ore floatation in which sulfonates with low solubility and low foam properties are required. Mixtures of less polar alkane sulfonyl chlorides are preferred for preparing sulfonates useful in liquid detergent formulations.

The process of the present invention may also be utilized for separating relatively pure alkane monosulfonyl chloride isomers from a sulfonyl chloride mixture. In this aspect of the invention, the mixture is combined with about an equal volume of non-polar solvent, such as pentane or hexane. The resulting mixture is extracted with a selective solvent for highly polar alkane sulfonyl chloride compounds, such as nitromethane. The resultant extract and extracted mixtures are then cooled to temperature levels sufficient to cause the crystallization of portions thereof. The crystalline materials are separated from the remaining uncrystallized liquid mixtures in a conventional manner, such as by filtration using a chilled filter. Upon melting the crystalline materials at room temperature, solid material comprised primarily of alkane monosulfonyl chloride is recovered. Further, the non-polar solvent rich liquid obtained from the melting of the crystalline material formed from the extracted mixture contains a high concentration of alkane monosulfonyl chlorides. These may be recovered by evaporation of the solvent.

A preferred technique for carrying out the process of the present invention to obtain alkane sulfonyl chloride product fractions more or less concentrated in highly polar compounds is performed by adding about an equal volume of a preferential polar solvent for the sulfonyl chlorides, such as nitromethane, to the sulfonyl chloride mixture, and then an equal volume of a non-polar solvent which is immiscible with polar solvent, such as pentane or hexane. The order of addition of the polar and non-polar solvents may be reversed or the solvents may be added to the mixture simultaneously. The resulting mixture separates into two phases, one of which consists of polar solvent containing a major portion of the alkane sulfonyl chlorides. The other phase consists of non-polar solvent containing a minor portion of the sulfonyl chloride compounds and most of the impurity compounds such as unreacted alkane, halogenated alkane, etc. contained in the mixture. As has been heretofore known, the polar solvent phase may be separated and rewashed with additional non-polar solvents to obtain a solution containing alkane sulfonyl chlorides relatively free of alkane impurity compounds.

The relatively pure extracted alkane sulfonyl chloride mixture is cooled to a temperature such that a portion thereof is crystallized, and the crystalline material, consisting primarily of the highly polar sulfonyl chloride compounds, is separated from the remaining mixture of less polar compounds. The separated crystalline sulfonyl chloride mixture is melted to obtain a mixture containing a high concentration of polar compounds. The polar solvent fraction remaining after extraction may also be cooled to crystallize less polar alkane sulfonyl compounds which may in turn be separated therefrom.

As will be understood, the process of the present invention may be varied to obtain fractions containing relatively high concentrations of the more or less polar alkane sulfonyl chloride compounds as desired. As will be further understood, the temperature to which a particular alkane sulfonyl chloride mixture must be cooled to obtain the separation of the polar sulfonyl chloride compounds will vary with the particular alkane starting material utilized in the reaction, the particular solvents employed, etc. Generally, however, for alkane sulfonyl chloride mixtures formed from alkane compounds having at least 5 carbon atoms, temperatures below about 0° C. are required. Furthermore, as the temperature of a particular mixture is lowered, more of the sulfonyl chloride compounds are crystallized. Thus, more or less of the highly polar compounds may be separated from a particular mixture of alkane sulfonyl chlorides according to the present invention by varying the temperature to which the mixture is cooled.

The invention will be further understood by referring to the examples given hereinbelow. In the examples, the analyses of the various mixtures tested were determined using a technique known as Thin Layer Chromatography (TLC). TLC may be defined as a technique for the resolution of components of a mixture by way of differential migration. The technique is carried out by placing a drop of the mixture to be analyzed near the bottom edge of a glass plate which has been coated with a thin layer of adsorbent material, such as activated silica gel. The plate is then placed in a solvent chamber containing a solution of solvent, such as benzene and cyclohexane. The plate is positioned so that the bottom edge thereof is wetted by the solvent solution and so that the sample spot is from about one-quarter to one-half inch above the solvent level. The plate is then allowed to develop, that is, the solvent is allowed to travel up the plate to near the top portion thereof. The plate is then air-dried and subsequently charred in a covered flat bottom dish at approximately 140° C. in the presence of sulfur trioxide gas. The components in the mixture analyzed having the greatest affinity for the silica gel adsorbent move only a small distance if at all with the solvent, while the materials having lesser affinity for the adsorbent move up the plate various distances. The charred plate shows the individual components as dark spots thereon. The intensity and area of each dark spot is proportional to the moles of the component it represents. Thus, by observing the position of the spots on the plate and the intensity of the spots, it is possible to identify particular compounds and estimate their concentration in the mixture analyzed.

Through a series of laboratory tests it has been shown that alkane disulfonyl chlorides and polysulfonyl chlorides move only a small distance, if at all, on the TLC plate. The monosulfonyl chlorides move a considerable distance up the plate with the solvent, and chloroalkanes move even further. This difference in movement on the plate is directly attributable to the polarity of the various compounds. That is, the chloroalkanes which are less polar than the alkane monosulfonyl chlorides move further than the monosulfonyl chlorides. The monosulfonyl chlorides are less polar than the di- and polysulfonyl chlorides and consequently move further with the solvent.

EXAMPLE 1

A 2100 milliliter sample of laboratory-prepared mixed hexadecane sulfonyl chloride was diluted with an equal volume of n-hexane. The mixture was extracted with four 250 ml. portions of nitromethane at room temperature. The nitromethane extract material (the extract mixture) was then cooled to −30° C. which caused a considerable portion of the mixture to crystallize. The solid crystallized material was separated by filtration using a chilled filter. The separated crystalline material was then allowed to warm up to room temperature which caused the melting of a portion thereof. As the crystalline material melted, the filtrate was collected in three equal fractions. TLC analysis of the three fractions indicated the first to be primarily a nitromethane solution of di- and polysulfonyl chloride. The second fraction was a nitromethane solution of about one-half disulfonyl chloride and polysulfonyl chloride and the other half monosulfonyl chloride. The third fraction was primarily nitromethane which had crystallized. Approximately 10 grams of solid material remained after the crystalline nitromethane had all melted. Analysis of this solid material showed it to be predominantly highly polar hexadecane monosulfonyl chloride with the same physical properties as primary hexadecane monosulfonyl chloride.

EXAMPLE 2

The portion of the hexadecane sulfonyl chloride and hexane mixture remaining after the extraction with nitromethane described in Example 1 (the extracted mixture) was cooled to −15° C. which caused the crystallization of a portion thereof. The crystalline material was separated by filtration on a chilled filter and then allowed to warm up to room temperature which caused the partial melting thereof. After the partial melting of the crystalline material, 31 grams of a solid material remained. TLC analysis of this solid material indicated it to be approximately 95% hexadecane monosulfonyl chloride. Further, the analysis showed the monosulfonyl chloride to be relatively pure highly polar 1-hexadecyl sulfonyl chloride.

The liquid which melted from the separated crystalline material was collected and the hexane contained therein evaporated. After evaporation of the hexane, 1663 grams of relatively pure liquid hexadecane monosulfonyl chloride remained.

EXAMPLE 3

This example is given to illustrate that the quantity and particular highly polar alkane sulfonyl chloride compounds which crystallize vary with the temperature to which the alkane sulfonyl chloride mixture is cooled.

Three laboratory experiments were run to determine the effect of temperature on the resulting crystalline separation. In each experiment, 20 grams of a mixture of tetradecane monosulfonyl chloride isomers were mixed with 20 grams of n-pentane. Each mixture was cooled to the temperature given in Table I below with stirring in a constant temperature bath, and the crystalline material formed was removed by filtration using a chilled filter. Both the liquid fraction remaining after the separation and the separated crystalline material were solvent stripped and weighed. The results of these tests are shown in Table I below:

TABLE I

Crystallization and separation of a tetradecane monosulfonyl chloride isomer mixture at various temperatures

| Sample | Crystallization temperature (° C.) | State at room temperature and weight of crystalline fraction obtained (g.) | Weight of liquid filtrate remaining after separation of crystalline fraction (g.) |
|---|---|---|---|
| 1 | −20 | 3.0 (solid) | 15.5 |
| 2 | −40 | 4.9 (solid) | 14.8 |
| 3 | −72 | 17.0 (liquid) | 4.6 |

Each of the fractions obtained and shown in Table I were analyzed by TLC. The results of these tests are shown in Table II below:

TABLE II

TLC analyses of crystalline and filtrate fractions shown in Table I

| Fraction | Fraction weight (grams) | Composition (weight percent) | |
|---|---|---|---|
| | | More polar compounds | Less polar compounds |
| Sample 1: | | | |
| Crystalline fraction | 3.0 | 90 | 10 |
| Filtrate fraction | 15.5 | 5 | 95 |
| Sample 2: | | | |
| Crystalline fraction | 4.9 | 90 | 10 |
| Filtrate fraction | 14.8 | 5 | 96 |
| Sample 3: | | | |
| Crystalline fraction | 17.0 | 40 | 60 |
| Filtrate fraction | 4.6 | 0 | 100 |

From the data given in Tables I and II above, it may be seen that the quantity of crystalline material formed from an alkane sulfonyl chloride mixture increases with decreasing temperature and the distribution of the more and less polar compounds in the crystalline material and remaining filtrate varies with temperature.

Thus, the present invention is well adapted to carry out the objects and attain the ends and advantages mentioned as well as those inherent therein. While presently preferred embodiments of the invention have been given for purposes of disclosure, numerous changes will readily suggest themselves to those skilled in the art which are encompassed within the spirit of this invention and the scope of the appended claims.

What is claimed is:

1. In a process of separating the alkane sulfonyl chloride reaction mixtures obtained from the combined reaction of sulfur dioxide and chlorine with a paraffin hydrocarbon into fractions of different polarity which comprises the steps of:
    (a) combining about an equal volume of a non-polar solvent with said reaction mixture; and
    (b) extracting said combined mixture with a polar selective solvent for highly polar alkane sulfonyl chlorides, said polar selective solvent being immiscible with the non-polar solvent; the improvement comprising sequentially:
    (c) employing nitromethane as the polar selective solvent;
    (d) cooling the extracted liquid phase mixture which remains after extraction with nitromethane to a temperature effective to cause the crystallization of the more polar compound contained therein;
    (e) separating said crystalline material comprising the non-polar solvent and alkane monosulfonyl chlorides from the remaining solution comprising less polar compounds;
    (f) partially melting the separated crystalline material of (e) thereby obtaining a first liquid fraction comprising non-polar solvent of (a) and alkane monosulfonyl chlorides, and a remaining solid comprising 1-alkane monosulfonyl chloride; and
    (g) separating the melted material of (f) from the solid of (f).

2. The process of claim 1 wherein the non-polar solvent is n-hexane.

3. The process of claim 2 wherein the extracted mixture of step (d) is cooled to at least below 0° C.

4. The process of claim 1 which is further characterized to include the steps of:
    (i) cooling the nitromethane, selective solvent extract mixture of step (b) to a temperature sufficient to cause crystallization of a solid comprising nitromethane, alkane monosulfonyl chlorides, alkane disulfonyl chloride, and alkane polysulfonyl chlorides contained therein; and
    (j) separating said solid of step (i) from the remaining solution containing less polar compounds.

5. The process of claim 12 which is further characterized to include the step of:
(k) allowing the solid of step (i) which is separated in step (j) to partially melt thereby obtaining a liquid fraction comprising alkane polysulfonyl chlorides plus alkane disulfonyl chlorides plus nitromethane and a solid fraction comprising alkane monosulfonyl chloride plus alkane disulfonyl chlorides plus nitromethane.

6. The process of claim 4 wherein the non-polar solvent is n-hexane.

7. The process of claim 6 wherein the extracted liquid phase mixture of step (d) is cooled to at least below 0° C.

8. The process of claim 7 wherein the nitromethane selective solvent extract of step (b) is cooled to at least below 0° C.

9. The improved process of claim 1 further characterized to include step (h) wherein the melted material of step (g) is heated to volatilize the non-polar solvent of (a) therefrom to recover purified alkane monosulfonyl chlorides.

10. In a process for separating the alkane sulfonyl chloride reaction mixtures obtained from the combined reaction of sulfur dioxide and chlorine with a paraffin hydrocarbon into fractions of different polarity which comprises the steps of:
(1) combining about an equal volume of a non-polar solvent with the reaction mixture; and
(m) extracting the combined mixture with nitromethane, the nitromethane being immiscible with the non-polar solvent; the improvement comprising sequentially:
(n) cooling the nitromethane solvent extract to a temperature sufficient to cause crystallization of a solid comprising nitromethane, alkane monosulfonyl chlorides, alkane disulfonyl chloride, and alkane polysulfonyl chlorides contained therein;
(o) separating the solid of step (n) from the remaining solution containing less polar compounds; and
(p) allowing the solid of step (n) which is separated in step (o) to partially melt thereby obtaining a liquid fraction comprising alkane polysulfonyl chlorides plus alkane disulfonyl chlorides plus nitromethane and a solid fraction comprising alkane monosulfonyl chlorides plus alkane disulfonyl chloride plus nitromethane.

11. The process of claim 10 wherein the non-polar solvent is n-hexane, and wherein the nitromethane solvent extract of step (n) is cooled to at least below 0° C.

References Cited

UNITED STATES PATENTS 2,424,420   7/1947   Ross et al. _____ 260—543 R

FOREIGN PATENTS 52,891   3/1967   Poland _____ 260—543

OTHER REFERENCES

Perry: Chemical Engr's Handbook 4th ed. (1963), pp. 17, 10, 11.

Assinger et al., Erdoel Kohle 18 (4) (1965) (English translation supplied by applicants), pp. 273–81.

LORRAINE A. WEINBERGER, Primary Examiner

R. D. KELLY, Assistant Examiner

UNITED STATES PATENT OFFICE
CERTIFICATE OF CORRECTION

Patent No. 3,746,759          Dated July 17, 1973

Inventor(s) Carl D. Kennedy - Wallace R. Weaver

It is certified that error appears in the above-identified patent and that said Letters Patent are hereby corrected as shown below:

Column 6, in Table II, line 13, last column, please change "96" to --95--.

Column 7, line 1, please change "12" to --4--.

Signed and sealed this 1st day of January 1974.

(SEAL)
Attest:

EDWARD M. FLETCHER, JR.
Attesting Officer

RENE D. TEGTMEYER
Acting Commissioner of Patents